US006980983B2

(12) United States Patent
Banerjee et al.

(10) Patent No.: US 6,980,983 B2
(45) Date of Patent: Dec. 27, 2005

(54) METHOD FOR COLLECTIVE DECISION-MAKING

(75) Inventors: Dwip N. Banerjee, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 09/923,573

(22) Filed: Aug. 7, 2001

(65) Prior Publication Data

US 2003/0033302 A1 Feb. 13, 2003

(51) Int. Cl.[7] .............................................. G06F 17/30
(52) U.S. Cl. .................. 707/3; 707/6; 707/2
(58) Field of Search ............................. 707/1–10, 101, 707/102, 104; 705/7, 9, 10, 45; 709/206; 706/45; 715/500.1

(56) References Cited

U.S. PATENT DOCUMENTS

| | | | |
|---|---|---|---|
| 5,617,539 A | | 4/1997 | Ludwig et al. |
| 5,799,151 A | | 8/1998 | Hoffer |
| 5,799,297 A | * | 8/1998 | Goodridge et al. ............ 707/1 |
| 5,854,893 A | | 12/1998 | Ludwig et al. |
| 5,933,597 A | | 8/1999 | Hogan |
| 5,941,945 A | | 8/1999 | Aditham et al. |
| 6,064,976 A | * | 5/2000 | Tolopka ......................... 705/9 |
| 6,078,948 A | | 6/2000 | Podgorny et al. |
| 6,092,048 A | * | 7/2000 | Nakaoka ........................ 705/9 |
| 6,112,188 A | * | 8/2000 | Hartnett ....................... 705/35 |
| 6,119,149 A | | 9/2000 | Notani |
| 6,138,120 A | | 10/2000 | Gongwer et al. |
| 6,151,601 A | * | 11/2000 | Papierniak et al. ........... 707/10 |
| 6,151,622 A | | 11/2000 | Fraenkel et al. |
| 6,192,419 B1 | | 2/2001 | Aditham et al. |
| 6,195,091 B1 | | 2/2001 | Harpie et al. |
| 6,415,304 B1 | * | 7/2002 | Horvitz ................... 715/500.1 |
| 6,553,358 B1 | * | 4/2003 | Horvitz ....................... 706/45 |
| 6,694,007 B2 | * | 2/2004 | Lang et al. ................. 379/222 |
| 2001/0027446 A1 | * | 10/2001 | Metcalfe ....................... 705/67 |
| 2002/0138582 A1 | * | 9/2002 | Chandra et al. ............ 709/206 |
| 2002/0169658 A1 | * | 11/2002 | Adler .......................... 705/10 |
| 2002/0174000 A1 | * | 11/2002 | Katz et al. ..................... 705/7 |
| 2003/0208429 A1 | * | 11/2003 | Bennett ....................... 705/36 |
| 2003/0217052 A1 | * | 11/2003 | Rubenczyk et al. ........... 707/3 |

FOREIGN PATENT DOCUMENTS

JP  11232235  8/1999

* cited by examiner

*Primary Examiner*—Charles Rones
*Assistant Examiner*—Neveen Abel-Jalil
(74) *Attorney, Agent, or Firm*—Mark S. Walker; Streets & Steele; Frank J. Campigotto

(57) ABSTRACT

A method and a computer program product for promoting collaborative, consensus-driven decisions from a plurality of decision-making entities using electronic communications in a real-time forum. The inventive instant messaging application can be used for registering participants, developing forum pages, communicating queries, receiving messages and tallying responses that can enable implementation of online trading transactions. The application module and support databases are maintained by one or more central coordinators that reside as software objects on a server. Setpoint values are used for measuring the extent to which the participants' cumulative response satisfies one or more decision parameters. Arbitration and intra-group caucussing can also be initiated as a means to promote consensus and arrive at a collective decision. The collective decision can be used to initiate a specific course of action that may involve further communications with one or more remote trading networks.

35 Claims, 7 Drawing Sheets

METHOD FOR COLLECTIVE DECISION-MAKING

BACKGROUND OF THE INVENTION

1. Field of the Invention

The present invention relates to a method of collective decision-making using electronic communication media.

2. Description of the Related Art

There are computer-implemented programs currently available to support network conferencing, such as teleconferencing, videoconferencing and the like. These programs extend traditional conferencing capabilities from conference centers, where groups of individuals assemble in the same room, to the desktop computer where individuals can participate in conferences from their home or office. In addition, multi-user interaction can be advanced through collaboration management programs that enable data sharing across multiple hardware and software platforms.

For systems that permit sharing of data tied to application programs, it is generally required to share the application that supports the data. A problem that often occurs in these network systems is that individual users compete for access to application programs. Such competing interests interfere with data flow and as a result, preclude the use of more efficient methods that can only be exploited in a collaborative environment.

A collaboration management system integrates real-time and asynchronous data flow, such that computers running one or more applications can be connected via a network, such as the Internet, or a local area network. An advantage of collaboration management systems is that new application programs can be easily and inexpensively added to the system and that the collaboration can occur across different platforms.

Traditional trading activity has been based on individual bidding and buying. A trading network is characterized by computer modules that enable real-time communications between one or more computer networks supporting a plurality of users. Trading networks increasingly involve the use of one or more application programs for customizing user services, such as pricing updates and tax statements customized for each client's portfolio. However, even though online trading networks have facilitated the buying and selling of stocks, the decision to buy a particular stock has largely remained an individual decision.

Therefore, what is needed is a method that allows a group of individuals or entities to act as a single decision-making unit in determining whether to implement a course of action, such trading stock. It would be desirable if the decision-making process and implementation of the decision were integrated to simplify the overall task and assure that the collective decision is accurately implemented. It would also be desirable if the decision-making process following certain user-established criteria for arriving at a decision.

SUMMARY OF THE INVENTION

The present invention provides a computer implemented method comprising maintaining identification of a group of decision-making entities in a memory device and maintaining a setpoint representing a minimum cumulative support required to implement a proposed action in the memory device. A query is then communicated to the plurality of decision-making entities, wherein the query includes a description of the proposed action. Next, query responses are received from the plurality of decision-making entities, wherein each response includes an indicator of support for the proposed action. Upon determining the cumulative support from the query responses received, the proposed action is automatically implementing if the cumulative support is greater than the setpoint. The indicator of support may be of a type selected from qualitative, quantitative, functional or a combination thereof. Optionally, the identification of each decision-making entity may include a weighting factor to be applied against the indication of support received from that decision-making entity in determining the cumulative support for the proposed action. Furthermore, the step of automatically implementing the decision may further include transmitting an instruction to one or more trading networks. Further still, the method may include receiving a request from one of the decision-making entities to initiate a query, wherein the request includes the proposed action.

Optionally, the method may include additional steps such as communicating messages to each of the plurality of decision-making entities, imposing arbitration among the plurality of decision-making entities if the query responses provide cumulative support less than the minimum setpoint, or initiating an intra-group caucus between a plurality of the decision-making entities. The communications may occur over a wireless network and/or utilize instant messaging. It is also noted that one or more of the plurality of decision-making entities may communicate through a personal digital assistant. Where the decision-making entities have different computer platforms or applications, the method involve a collaboration manage to interface therebetween.

In one embodiment, the method further includes communicating the cumulative support to the plurality of decision-making entities, formulating a second query based on this cumulative support, and receiving responses to the second query from the plurality of decision-making entities, wherein each of the second responses include a revised indication of support. Accordingly, the method then determines a revised cumulative support for the second query incorporating the revised indications of support, and implements the proposed action if the revised cumulative support is greater than the minimum setpoint.

The invention also provides a computer program product including instructions embodied on a computer readable medium. The instructions comprise: maintaining instructions for maintaining identification of a group of decision-making entities in a memory device; maintaining instructions for maintaining a setpoint representing a minimum cumulative support required to implement a proposed action; communicating instructions for communicating a query to the plurality of decision-making entities, wherein the query includes a description of the proposed action; receiving instructions for receiving query responses from the plurality of decision-making entities, wherein each response includes an indicator of support for the proposed action; determining instructions for determining the cumulative support from the query responses received; and implementing instructions for automatically implementing the decision if the cumulative support is greater than the setpoint.

DETAILED DESCRIPTION OF THE INVENTION

Figure 1:
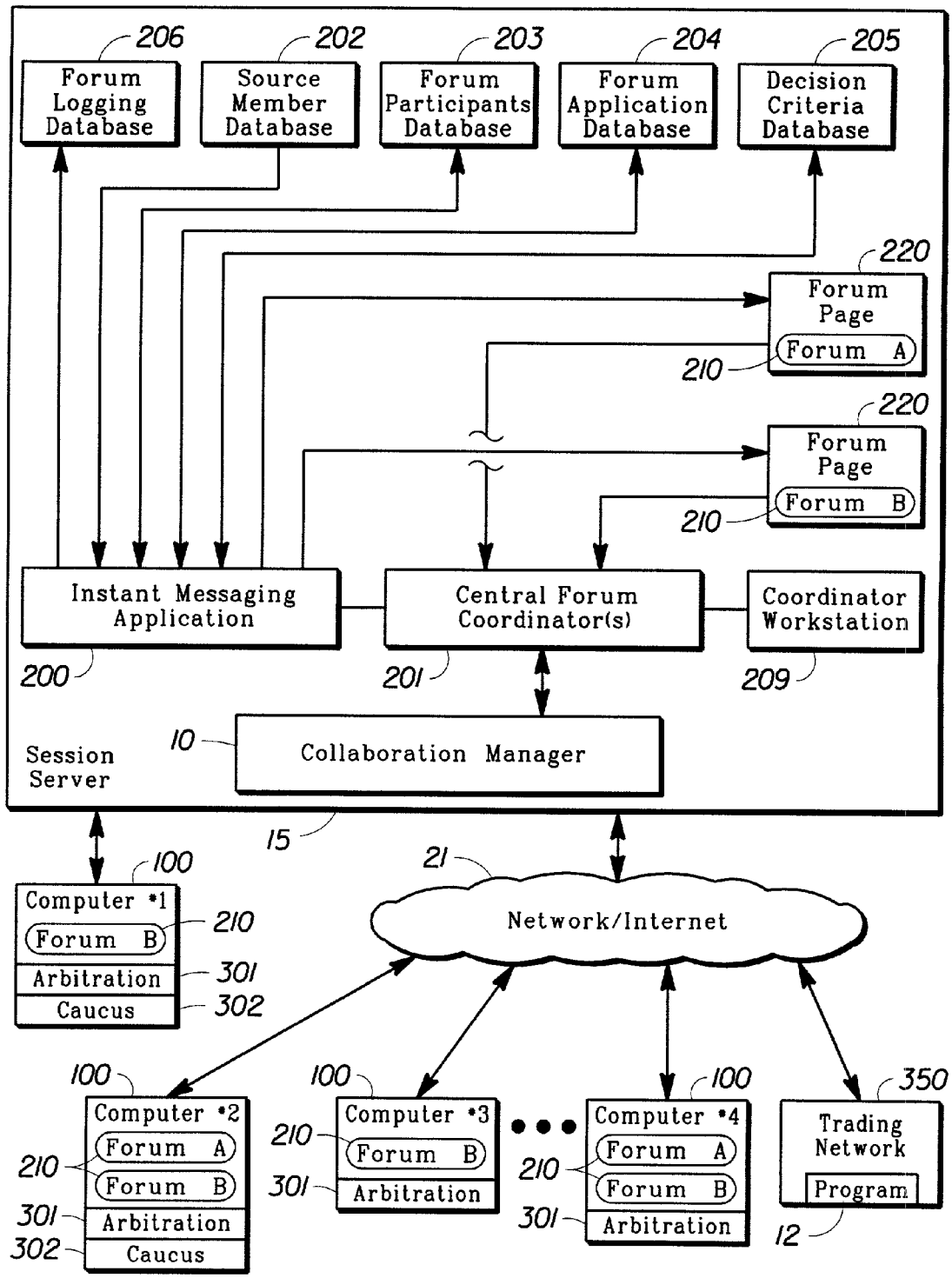
FIG. 1 is a block flow diagram showing a system of the present invention supporting one or more decision-making forums.

The present invention provides a method and computer program product for promoting a collective decision from a plurality of decision-making entities that are in electronic communication with a central forum coordinator that is responsible for managing the decision-making process. The central forum coordinator, or a program under the direction of the central forum coordinator, establishes a forum for each proposed action or a group of related proposed actions and establishes a group of decision-making entities that should be involved in the decision whether to implement the proposed action or group of related proposed actions. The central forum coordinator may cooperate with an instant messaging application to provide real-time communication with and between the decision-making entities. The central forum coordinator may also cooperate with a collaboration manager that allows cross-platform and/or cross-application communication with or between the decision-making entities.

The central forum coordinator is a computer-implemented process that queries a plurality of decision-making entities to arrive at decisions that represent the collective will of the group through a collaboration management system. If necessary, the queries can be communicated through a collaboration manager that converts between data having different formats. Thus, the use of a collaboration system opens new markets for collaborative trading based on multi-user inputs.

The invention solves the efficiency problems inherent in existing decision-making processes by using a collaboration management system and an interactive decision-making method that calculates support for a proposal directly. Queries are used to invoke responses from a plurality of decision-making entities authorized to participate in a specific forum (i.e., the "forum participants"). The cumulative responses to these queries are used to calculate the cumulative support for a proposal and thereby, arrive at a collective decision. The interactive capabilities reduce the number of iterative steps, including the need for manual confirmation, that impede progress in asynchronous decision-making processes.

A decision-making forum is a process in which queries and other communications between a central forum coordinator and a plurality of forum participants can be transmitted through a graphical user interface ("GUI") for display as a forum page or Internet Web page. A decision-making forum may utilize an instant messaging application in order to support real-time user interaction and further promote consensus-driven decisions.

The instant messaging application is administered by a central forum coordinator that is responsible for generating and carrying out instructions for progressing the forum. Specific functions of the central forum coordinator may involve inputting data, developing decision parameters and forum queries, monitoring communications and setting at least one setpoint value that can be used to determine when cumulative support for a decision has been reached. Preferably, the central forum coordinator resides as a software object on the server.

A query must include a description of a proposed action and a decision parameter that dictates the manner in which an indication of support should be presented. For example, the decision parameters can be qualitative, quantitative or functional in nature or combinations thereof. By using a decision parameter, all responses will be in a comparable form and allow the indications of support to be processed by the central forum coordinate in accordance with a predetermined formula, such as cumulative support or a weighted cumulative support. Other formulas, simple or complex, will be apparent to those in the art.

The queries are then communicated to one or more decision-making entities that are capable of participating in an interactive forum and specifically authorized to participate in the specific forum. The decision-making entities respond using the specified decision parameter to indicate support for the proposed action. The central forum coordinator determines if sufficient support for a proposition has been reached, i.e., the responses contain decision parameter values that, when processed by the predetermined formula, provide a collective value greater than a minimum setpoint value. If cumulative support for a decision is reached, then the decision is implemented. Preferably, the decision is automatically implemented through electronic communication without requiring further human interaction.

In alternative embodiments, the central forum coordinator is vested with increasing authority. For example the central forum coordinator may be responsible for maintaining a list of potential decision-making entities. This listing can be used to automatically select the decision-making entities that have registered interests that coincide with those of a particular forum. The central forum coordinator may be responsible for communicating responses and any additional support needed to reach the minimum setpoint value, to one or more of the decision-making entities. The central forum coordinator may also initiate queries that were generated or requested by one or more of the decision-making entities, fashion further queries or adjust setpoint values as a means to reach cumulative support for a decision. The system format is sufficiently flexible to allow queries or minimum setpoint values to be formulated by one or more of the decision-making entities if they are so authorized. Other more complex, consensus-driven mechanisms may also be initiated by the central coordinator, such as incorporating weighting factors for selected responses, imposing arbitration as a means to avert an impasse or establishing a communication link with a third party to gather further information. Weighting factors, authorization levels and management vetos, or the like can be used to customize forum mechanics best suited to the interests and experience levels of the participants.

The central forum coordinator may have the authority to implement actions automatically based on the outcome of the decision. Alternatively, the central coordinator may query the decision-making entities directly to obtain authorization to implement a decision. Optionally, the central coordinator may seek approval from one or more decision-making entities having veto-power prior to implementing a specific course of action. Finally, additional coordinators may be added to the system, each of which carry on all or part of the responsibilities of the central forum coordinator. In any event, the central forum coordinator initiates actions based on the cumulative support for a decision, for example communicating a trading instruction to a trading network.

Each forum is based on predetermined protocols, procedures or formulas as established or setup by the parent organization which may be a corporation, a government entity or other institutional organization. A decision-making entity may be an individual, family, group, corporation, officer, employee, etc. that has registered an interest in participating in one or more forums (i.e., "the forum participants").

The central forum coordinator, preferably through use of the instant messaging application, uses database programs for storing and retrieving forum data, generating forum display templates, updating decision parameters and logging communications from forum participants. Other primary functions of the instant messaging application include registering decision-making entities as forum participants and then measuring the cumulative support for a decision as communicated by the forum participants interacting in an instant messaging forum.

The instant messaging forum is a medium that supports real-time user interaction and promotes rapid consensus-driven decisions. The instant messaging forum is used for communicating forum queries and other information between the central forum coordinator and a plurality of forum participants. Alternatively, the forum data can be transmitted through a graphical user interface ("GUI") for display as a Web page. The server generates a GUI that is downloaded and displayed by the browser (agent) supporting each forum participant's computer.

The central forum coordinator administers and supports the instant messaging application by providing numerous supervisory functions including (1) developing decision parameters and forum queries, (2) monitoring communications between forum participants, (3) inputting initial forum data into the application support databases, (4) setting at least one minimum setpoint value for determining when cumulative support for a decision has been reached, (5) initiating instructions and performing various administrative tasks, and (6) initiating actions based on the cumulative decision. Additional coordinators either residing on the host server or communicating with the program through a workstation can be added to the system, each of which may carry on all or part of the responsibilities of the central forum coordinator. For example, separate coordinators could be used in different divisions of a corporation, with the central forum coordinator being responsible for communications between divisions.

A collaboration manager is a program that receives electronic communications from hardware or software entities having different input formats and then converts this data to a primary format capable of being transmitting to a plurality of users communicating through a collaboration management system or network. The interaction between applications and users may be accomplished through a specification such as XML. The users may include individual computers, application programs or other network communication devices. The collaboration manager is used as a framework to build and support computer applications capable of receiving and transmitting electronic data from a plurality of users, some of which may communicate through the Internet. Alternatively, the electronic data can be communicated from an interactive trading network or other communications networks and then downloaded and displayed as a Web page.

A collaboration management system is a network that includes the collaboration manager, the collaborating users and further hardware and software modules supporting the collaboration manager as discussed below. The collaboration management system is used to format data for transmitting to one or more databases supporting the instant messaging application and to download instant messaging forum pages for display to forum participants, regardless of their computer platform.

Cumulative support for a proposal is measured by comparing forum participants' responses or the associated state change of one of more of the decision parameters with one or more pre-established setpoint values. The cumulative decision is conditioned on the collective response having achieved a predetermined setpoint value. This process can best be illustrated by a stock trading scenario. For example, a proposal for a specified stock purchase ("the proposed action") is communicated to all registered forum participants. The responses "for" and "against" the proposal (qualitative decision parameters) are tallied and recorded in an electronic database maintained by the instant messaging application. If the number of responses cast in favor of the proposal meet or exceed the pre-established minimum setpoint value, then cumulative support for the proposed action has been reached and a collective decision is made. This decision may authorize the central forum coordinator to implement the proposed action, for example by transmitting a stock purchase order to a remote trading network.

A collaborative decision of this nature can be used for developing further forum queries or for implementing a specific course of action that may involve further communications with one or more remote trading networks. Preferably, the specific action, for example authorizing the purchase of a proposed issue of stock, is implemented by the central forum coordinator.

Because the preferred method is executed by a computer program, the central forum coordinator or instant messaging application may further include consensus-building mechanisms or other program modifications best suited for a specific forum of interest. For example, the intrinsic value held by select participants may be incorporated into the decision-making process by attaching criticality factors to select queries, applying weighting factors to select responses, imposing arbitration as a means to avert an impasse, initializing intra-group caucussing as a means to further forum discussions, establishing non-forum communication links with a third parties to receive further information, or the like.

Optionally, the central forum coordinator may allow queries or setpoint values to be formulated by one or more decision-making entities which may also be forum participants. The central forum coordinator may be responsible for communicating responses, and any additional support needed to reach the minimum setpoint value, to one or more of the decision-making entities. Alternatively, the central forum coordinator may forward queries generated by one or more of the decision-making entities, fashion further queries or adjust setpoint values as a means to reach a cumulative decision.

In other embodiments, the central forum coordinator may be responsible for maintaining a list of potential decision-making entities having different authority levels and then selecting specific decision-making entities to participate in any given forum through a registration program. Some decisions may be conditioned on management veto or approval from other decision-making entities prior to initiating action. Alternatively, the central coordinator may query the decision-making entities directly to obtain authorization to implement a decision.

FIG. 1 is a block flow diagram showing the decision-making system of the present invention supporting one or more decision-making forums 210. The present invention provides a method and a computer program product designed to invoke collective decisions involving a plurality of forum participants acting as a collective decision-making forum 210. The decision-making system is shown including the instant messaging application 200, a plurality of forum participants' computers (or other communication devices) 100, at least one central forum coordinator 201, a collaboration manager 10, a server 15 and one or more remote trading networks 350. Preferably, the instant messaging application 200, central forum coordinator 201 and collaboration manager 10 reside on a common server 15 ("the server"). The server 15 may be a Web Application Server (WAS), a server application, a servlet process, or the like.

Each decision-making forum 210 is based on predetermined protocols as established by a parent organization consisting of a plurality of decision-making entities (members). A decision-making entity may be an individual, family, group, corporation, officer, employee, etc. that has registered an interest in participating an decision-making forum 210 (i.e., "the forum participants"). Preferably, each decision-making entity can participate in one or more decision-making forums 210 at the same time. In the preferred method, the subject matter of the decision-making forum 210 relates to stock trading. For example, a parent organization authorizes a forum to determine the collective support for a proposed stock transaction that is most readily performed by communicating with an interactive trading network 350.

Forum participants located at online computers (or other communication devices) 100 communicate over a computer network 21 as a means to determine the collective support of the group through an decision-making forum 210. The computer network 21 may be the Internet, an intranet, or other network. The instant messaging application 200 is programmed to communicate queries and forum data to registered forum participants' computers 100. The server software includes further programs that enable the server 15 to download forum pages 220 for display to registered forum participants, thereby approximating real-time interaction on a trading network 350.

A collaboration manager 10 is a computer program that converts communications having different data formats to a primary format that can be processed by the instant messaging application 200. The collaboration manager 10 provides a framework for building and supporting applications capable of receiving and transmitting data between a plurality of forum participants, some of which communicate through the Internet. Specifically, the collaboration manager 10 enables communications between the instant messaging application 200 and forum participants' computers 100, trading networks 350 or other communication devices. Preferably, the collaboration manager 10 receives all forum communications, but broadcasts communications only to forum participants which have registered an interest (and possess the requisite authorization level) in receiving information for a specific decision-making forum 210.

One or more central forum coordinators 201 can be registered for communicating with the collaboration manager 10. The central forum coordinator 201 is the software object that supervises the instant messaging application 200. The functions of the central forum coordinator 201 include formulating queries, monitoring and controlling forum progress and implementing the collective decision if the decision criteria are met. The source data for initializing an decision-making forum 210 is input through the coordinator workstation 209 onto a forum template that generates the instructions that the instant messaging application 200 uses for maintaining the support databases and calculating cumulative support for a decision. Additional coordinators either residing on the server 15 or communicating through the coordinator workstation 209, can be added to the system, each of which may carry on all or part of the responsibilities of the central forum coordinator 201. Alternatively, all or part of the responsibilities of the central forum coordinator 201 may be performed by the collaboration manager 10.

The collaboration manager 10, the instant messaging application 200 and the central forum coordinator 201 are preferably implemented in the JAVA programming language, which utilizes object-oriented program ("OOP") techniques. As understood by those skilled in the art, OOP techniques involve the definition, creation, use and destruction of "objects." Objects are software entities comprising data elements (i.e., "attributes") and methods (i.e., functions or "rules") that manipulate data elements that can be transmitted through object-streaming protocols. These protocols are designed for reliable delivery and are secure on open networks such as the Internet 21.

The instant messaging application 200 can accommodate numerous support databases as needed to implement a specific forum. Alternatively, all data relating to a specific decision-making forum 210 may be contained in a single database or other central memory location. Preferably, the decision-making system will include at least one forum application database 204 containing data on specific forums, such as forum initiation and duration, addresses for registered forum participants and trading representatives, and instructions (master file) for generating forum pages. The forum application database 204 may also contain further requirements for quorum voting, management vetoes or other forum restrictions.

The decision-making system may include a source member database 202 that contains records of each decision-making entity that has expressed an interest in participating in one or more decision-making forums 210. It is envisioned that the source member database 202 will contain master records for each decision-making entity and each trading company (broker) approved by the parent organization. The instant messaging application can use the source member database 202 to automatically generate a forum participants database 203. The forum participants database 203 contains records for each member that has registered an interest in participating in a specific decision-making forum 210. For example, the forum participants database 203 may contain information relating to the participants' voting privileges, computer passwords, authorization status and communication addresses for cell phones, pagers, and other communication devices.

Further support databases may include a decision criteria database 205, a forum logging database 206, and a forum page database 220. In the preferred method, a decision criteria database 205 contains the decision parameters, set-point values, forum queries, and the like. The forum logging database 206 can include pricing updates for each stock proposal, time and record of all forum communications and documentation of arbitration sessions. The forum page database 220 contains one or more forum pages generated through instructions (master file) contained in the forum application database 204. Each forum page 210 can be uploaded by the server 15 for display on forum participants computers 100.

Preferably, the server 15 generates a graphical user interface ("GUI") that is downloaded and displayed by the browser (agent) supporting each computer 100. The GUI provides queries, messages and other forum data and allows forum participants to respond to queries or to initiate other actions (i.e., caucussing) directly. Optionally, forum participants can be identified and registered through instructions embedded on their computer 100 browsers and then hyperlink to a designated forum page for display through the network 21. Some forum data may be restricted. Only forum participants having the requisite authorization level are able to access restricted data. Proof of authority can include data such as a password or a combination of an online member identification and password assigned by a server 15.

Additionally, the instant messaging application 200 can invoke concensus-building mechanisms, such as online arbitration or intra-group caucussing, that may further involve data sharing with application programs or non-forum entities. The server 15 preferably includes electronic mail software for processing e-mail messages and storing e-mail messages transmitted between the central forum coordinator 201 and forum participants, registered trading agents or other entities involved in a decision-making forum 210.

The instant messaging application 200 is preferably capable of accommodating a plurality of decision-making forums 210 simultaneously. In accordance with one embodiment, the illustration in FIG. 1 depicts two decision-making forums 210 (i.e., forum "A" and forum "B") in progress. For example, forum "A" can be progressed to invoke a decision whether or not to purchase stock through a trading network 350. The instant messaging application 200 provides the method for calculating the cumulative support for the proposed stock purchase and determining if the cumulative support exceeds a minimum support level setpoint. A stock market trading program 12 residing on the trading network 350 collaborates with the instant messaging application 200 to provide the name and value of the proposed stock.

The instant messaging application 200 stores the trading data and initializes the support databases needed to drive decision-making forum "A" 210. The central forum coordinator 201 uses this information to generate a bidding query that is downloaded to forum page "A" and communicated to the plurality of forum "A" participants. Forum "A" participants collaborate by responding to the query through the GUI displayed on their computers 100. The instant messaging application 200 calculates the cumulative support for the proposed stock transaction based on the responses received. Preferably, more than one decision-making forum 210 may be accessed by the same computer 100 at the same time. As illustrated, "Computer #2" and "Computer #4" are participating in both forum "A" and forum "B".

If the cumulative support does not meet the minimum support level, then one or more consensus-building mechanisms can be implemented. As illustrated, an arbitration session 301 is initiated automatically for all forum "A" participants and customized queries downloaded for display on forum page "A". Also depicted is an ongoing intra-group caucus 302 progressing between forum "A" participants collaborating on "Computer #1" and "Computer #2" 100. Note that the forum "A" participant collaborating on "Computer #4" is not authorized to receive these caucus communications. Each forum "A" participant may respond to the customized queries through the GUI displayed on their computer 100. The process is repeated until a collective decision is reached or forum "A" is closed by a timer or other means. If collaborative support in favor of the stock proposal is reached, the decision to purchase the stock is implemented automatically by the central forum coordinator 201. The central forum coordinator 201 completes the transaction by communicating the order to the selected trading network 350. A similar process is implemented independently for forum "B".

Figure 2:
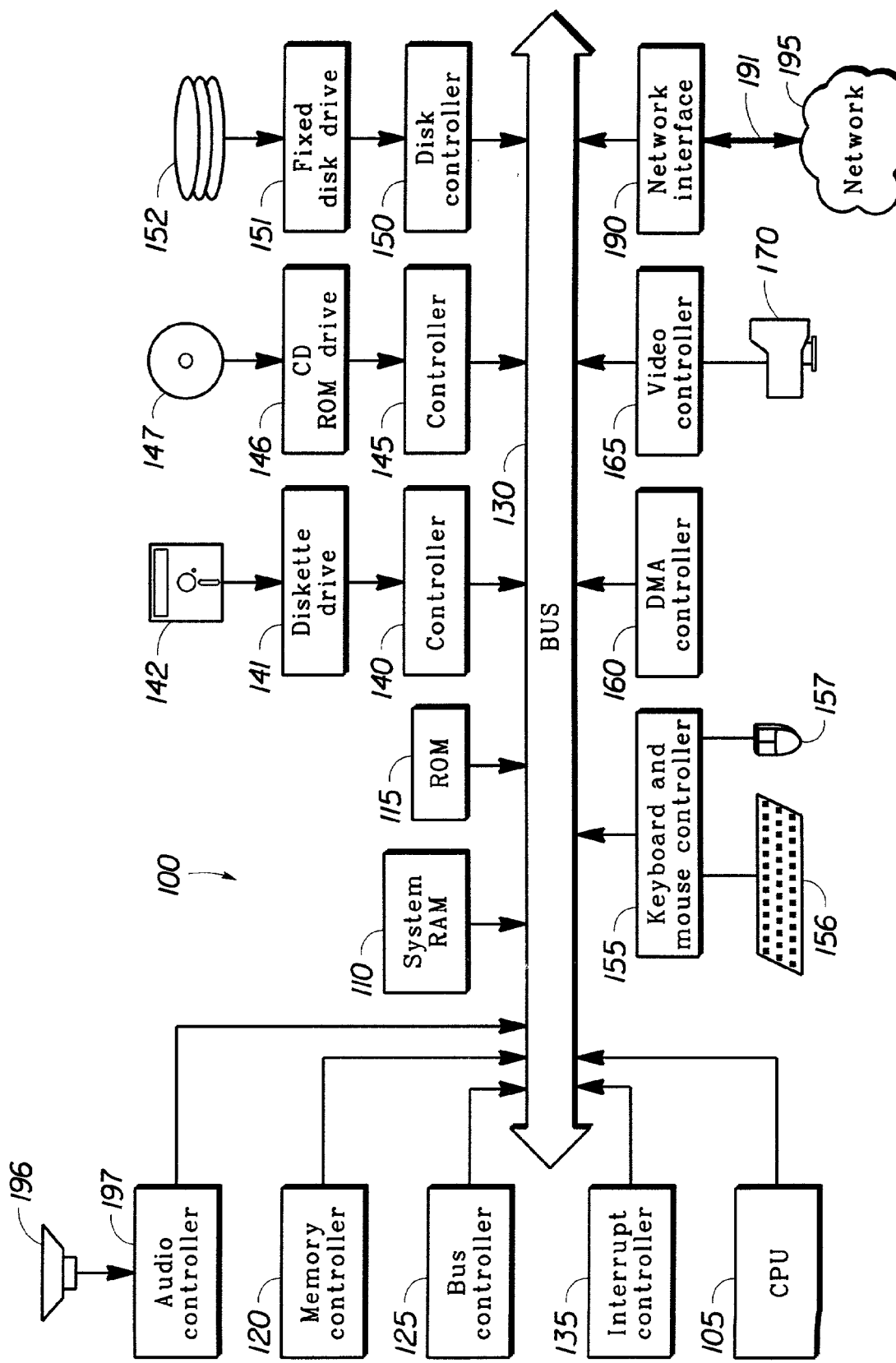
FIG. 2 is a schematic diagram illustrating prior art computer architecture suitable for use in executing the present invention.

FIG. 2 illustrates a prior art system architecture for a computer system 100, such as an IBM THINKPAD 701® computer, on which the decision-making method can be implemented. The computer system represented in FIG. 2 is provided for descriptive purposes only, and should not be considered a limitation of the invention. Although the description may refer to terms commonly used in describing particular computer systems, such as in IBM THINKPAD 701® computer, the description and concepts equally apply to other systems, including systems having architectures dissimilar to FIG. 2.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage of data may be provided by diskette 142, CD ROM 147, or hard drive 152. Data and software may be exchanged with computer system 100 via removable media 147 such as diskette or CD ROM. Removable media 147 is insertable into drive 146 that is, in turn, connected to bus 130 by a controller 145. Hard disk 152 is part of a fixed disk drive 151 that is connected to bus 130 by controller 150.

User input to computer system 100 may be provided by a number of devices. For example, a keyboard 156 and mouse 157 may be connected to bus 130 by controller 155. An optional audio transducer 196, which may act as both a microphone and a speaker, is connected to bus 130 by audio controller 197, as illustrated. It will be obvious to those reasonably skilled in the art that other input devices, such as a pen and/or tabloid and a microphone for voice input, may be connected to computer 100 through bus 130 and an appropriate controller and software, as required. DMA controller 160 is provided for performing direct memory access to RAM 110. A visual display is generated by video controller 165 that controls video display 170. Computer system 100 also includes a communications adaptor 190 that allows the system to be interconnected to a local area network (LAN) or a wide area network (WAN), or the Internet schematically illustrated by bus 191 and network 195.

Operation of computer system 100 is generally controlled and coordinated by operating system software, such as the OS/2® operating system, available from International Business Machines Corporation, Boca Raton, Fla. or Windows 95® from Microsoft Corp., Redmond, Wash. The operating system controls allocation of system resources and performs tasks such as processing scheduling, memory management, networking, and I/O services, among other things. In particular, an operating system resident in system memory and running on CPU 105 coordinates the operation of the other elements of computer system 100. The present invention may be implemented with any number of commercially available operating systems including OS/2®, UNIX®, Windows NT® and DOS, etc. One or more applications, such as Lotus Notes®, commercially available from Lotus Development Corp., Cambridge, Mass., may be executable under the direction of the operating system. If the operating system is a true multitasking operating system, such as OS/2®, multiple applications may execute simultaneously.

The present invention can be implemented on a variety of hardware platforms and can be implemented in a variety of software environments, perhaps using XML. A typical operating system may be used to control program execution within the data processing system. Furthermore, although the preferred method includes a "browser" as the agent which exchanges data in the security protocols with the Web Application Server, the agent at the online forum participants computers does not have to be a conventional browser, e.g., Netscape Navigator® or Microsoft Internet Explorer®. In order to secure the information transmitted to and from the server, the forum participant may be capable of Public Key Infrastructure (PKI) technology exchanged in a security protocol such as the Secure Sockets Layer (SSL) version 3.0 and above.

The present invention may be implemented in software that is stored as executable instructions on a computer readable medium on a forum participant's computer and the server system, such as mass storage devices or in memories. The server system preferably includes a conventional server software program such as International Business Machines' Websphere®, for administering the content and interaction carried out for a specific forum.

Figure 3:
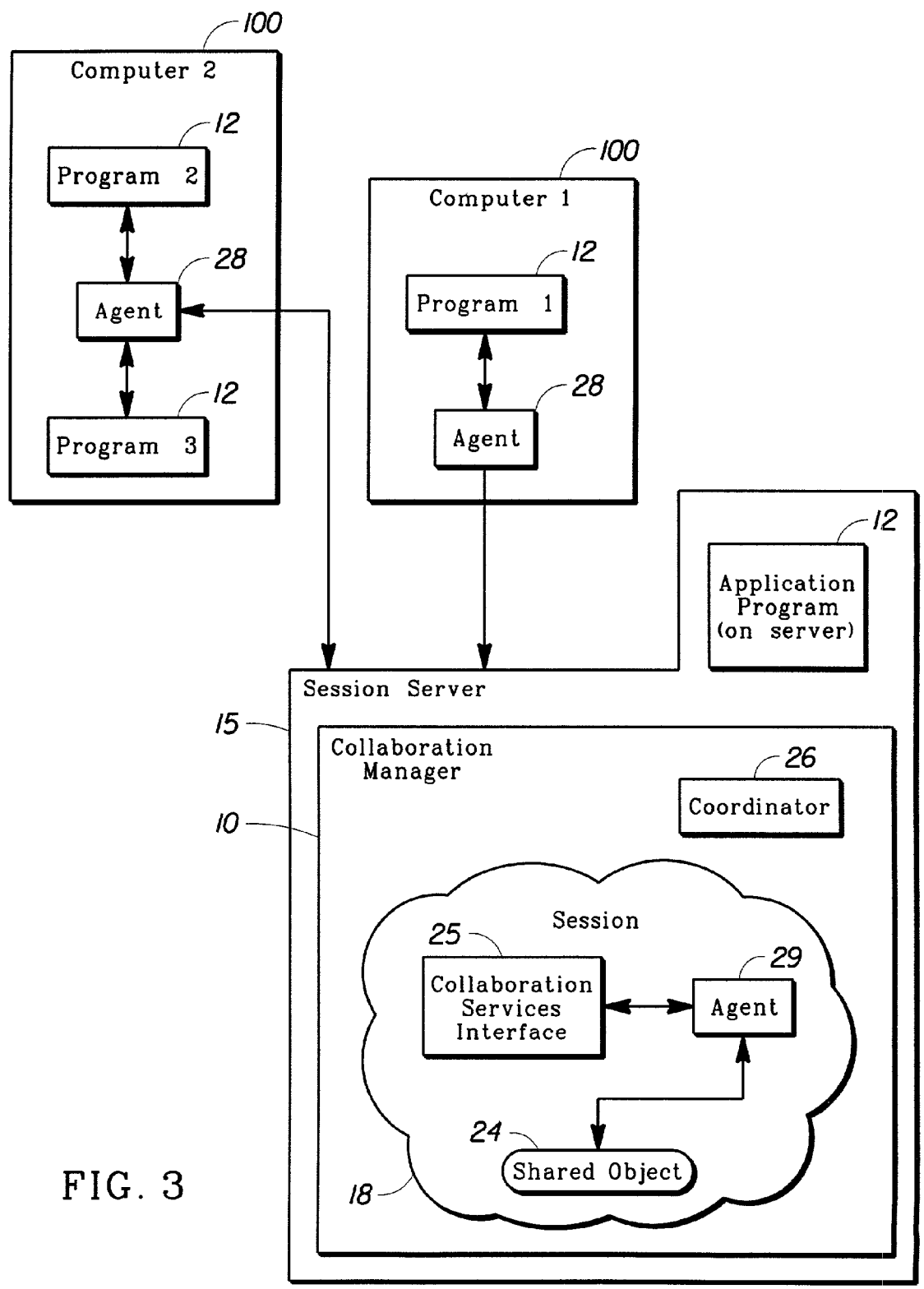
FIG. 3 is a schematic diagram illustrating an exemplary collaboration management system that facilitates development of application programs capable of sharing data, including data with arbitrary formats.

FIG. 3 is a schematic diagram illustrating an exemplary collaboration management system or network. The network includes a server 15 on which a collaboration manager 10 resides. The collaboration manager 10 enables communication between various computers 100 or other communications devices having different formats. Each of the computers 100 may have one or more application programs 12 running at the same time. Each of the application programs 12 are preferably stand-alone programs that can function independently, but can collaborate when operating with a collaboration manager 10.

The collaboration manager 10 includes at least one session object 18 and may include a further coordinator module 26. A coordinator module 26 is a software program that maintains a record of all messages posted to a session object 18 and all communications transmitted from a session object 18 to the application programs 12. A session object 18 is a software object that processes all communications exchanged between application programs 12. A computer agent (i.e., browser) 28 requesting to join a session registers an "interest" with the session object 18, where an "interest" is an attribute identifying the type of communications the application program 12 can receive. The session object 18 recognizes specific interests and enables data sharing between computers 100 having comparable registered interests.

The session object 18 includes an agent 29, a collaboration services interface 25 and a shared object 24. The collaboration agent 29 is responsible for locating a specific application program 12 and establishing a connection to it. The collaboration services interface 25 converts communications between programs having different input and output requirements. The shared object 24 can be created and maintained by the server 15 as a part of the session object 18. The shared object 24 posts messages to the session object 18, receives messages from the session object 18, and registers communication interests with the session object 18. This treatment of shared objects enables application program functions to be executed on the server 15 and consequently, reduces congestion across a collaborative network.

The collaboration manager 10 may communicate with the Internet representing a worldwide collection of networks and gateways that use the TCP/IP suite of protocols to communicate with one another. Online forum participants and remote servers may be represented by a variety of computing devices, such as mainframes, personal computers, personal digital assistants (PDAs), smart phones, etc. The distributed data processing system may include additional servers, participants, routers and other devices not shown.

Of course, the collaboration manager 10 may also communicate with the computers 100 over a number of different types of networks, such as, for example, an intranet, a local area network (LAN), or a wide area network (WAN). It should be recognized that the network may include permanent connections, such as wire or fiber optic cables, or temporary connections made through telephone or wireless communications.

Preferably, a graphic representation of the session object 18 is downloaded and displayed on each forum participant's computer 100. Furthermore, the graphic display of the session object 18 enables the coordinator module 26 to determine which forum participants computers 100 and other programs 12, such as the instant messaging application, are utilizing the session object 18. Each time a new member requests to join a session, the coordinator module 26 queries the session object 18 and confirms if the member is authorized to join the session.

Figure 4A:
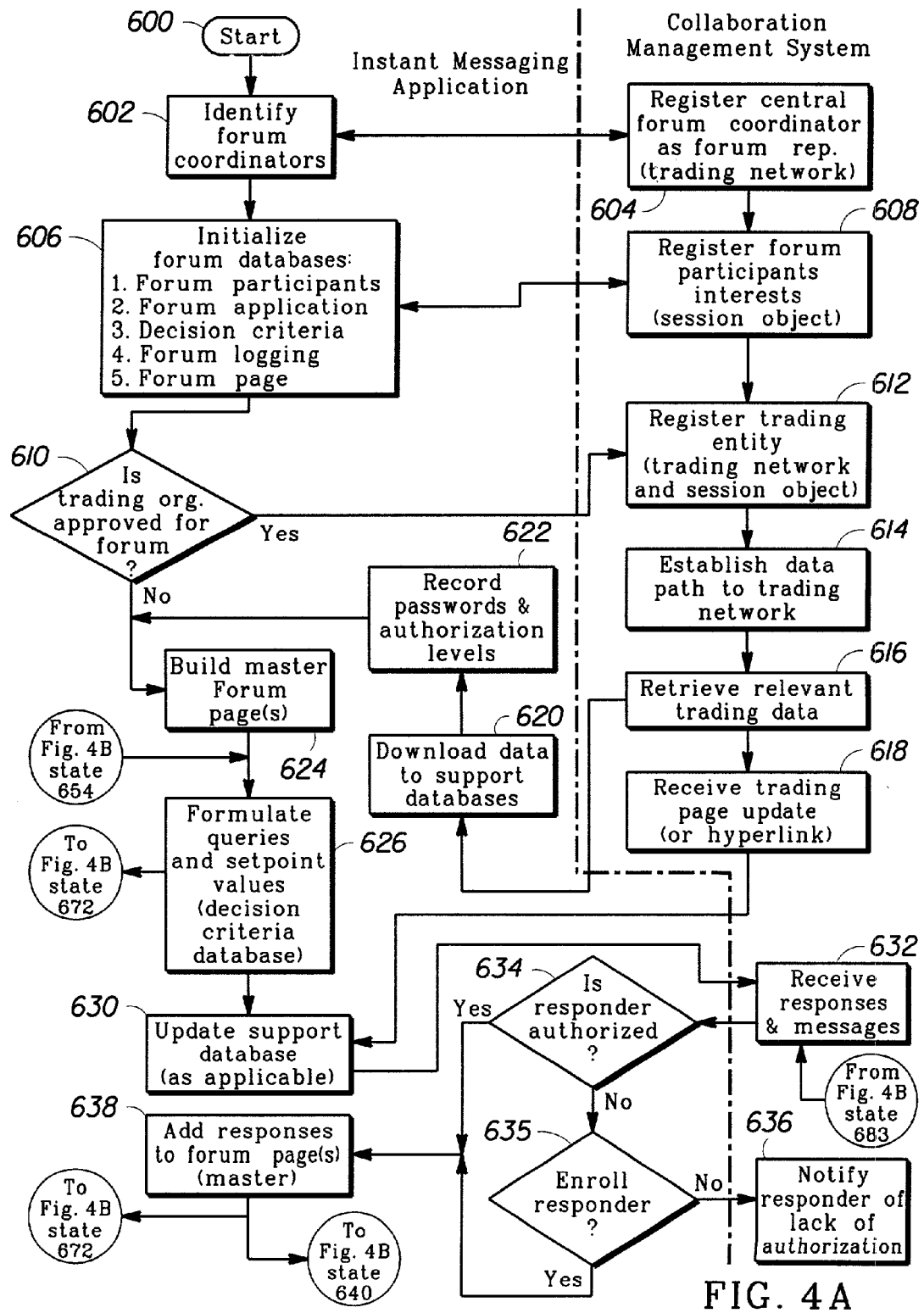
FIGS. 4A and 4B show a flow diagram of a preferred method for implementing an decision-making forum to determine the cumulative support for a trading proposal.

FIG. 4A is a flow chart of a method for implementing an instant messaging application, executable on the system of FIG. 1, that determines when cumulative support for a trading proposal has been reached. In state 602, one or more central forum coordinators, including at least one central forum coordinator that resides as a software object, are identified for the forum of interest. In state 604, the central forum coordinator is registered with one or more trading networks as the representative carrying out transactions on behalf of the forum.

In state 606, the instant messaging application initializes one or more databases supporting the forum of interest. Preferably, the following databases are established: (1) a forum participants database; (2) a forum application database; (3) a decision criteria database; (4) a forum logging database; and (5) a forum pages database. In addition, a source member database containing administrative information on all members of the parent organization is maintained for all forums. In state 608, the forum participants' interests are registered through the session object located on the server.

It should be recognized that forum-specific data may be input to the system by a forum coordinator communicating through a coordinator workstation as part of various states, including but not limited to states 602, 606, 624 and 626. Specifically, the workstation may allow an individual to provide the data necessary to build a master forum page, such as a query and a decision setpoint value.

In state 610, each trading company approved by management to participate in the forum of interest is identified and, in state 612, each company is registered with the session object located on the server. In state 614, the data path to the trading network is confirmed by the collaboration manager. In state 616, data, such as stock names, stock prices, trading representative addresses, and forum representative passwords are retrieved from the trading network server and downloaded into the corresponding forum databases in state 620. In state 622, any authorization or security passwords required for accessing data within the trading network are recorded into the appropriate forum support databases. Hyperlinks to any interactive trading pages collaborating with the forum can be initialized in state 618 and routine communication updates downloaded to the appropriate support databases in state 630.

In state 624, the electronic data stored in the various support databases is used to build one or more master forum pages. Forum page instructions can be interpreted by the browser (agent) for display on forum participants' computers. In state 626, the forum coordinators establish decision setpoints and formulate queries for communicating to forum participants. Optionally, the decision parameters and setpoint values can be adjusted as the forum progresses. The support databases are updated to include the setpoints and queries in state 630.

In state 632, the collaboration manager receives incoming forum responses and messages and verifies the address of the responder's computer browser (agent) in order to identify whether the responder is registered and duly authorized to participate in the ongoing forum. Alternatively, the central forum coordinator can query the collaboration manager to identify members utilizing the session object, for example members requesting access to the forum through the Internet. Optionally, password protection can be imposed for the initial response. If in state 634, it is determined that the responder is not properly authorized to participate in the forum, then the central forum coordinator may, in state 635, determine whether to "enroll" the responder in the forum. If, in state 635, the responder is not enrolled in the forum, then the responder is notified of the lack of authorization in state 636. If, in state 635, the responder is in fact enrolled in the forum, then the responder's response is added to the forum page in state 638.

If, going back to state 634, it is determined that the responder is properly authorized, then in state 638, the master forum page is updated to include the authorized response. Then, in states 672 through 682 (Refer to FIG. 4B) this data is downloaded for interactive display to registered participants consistent with their authorization levels. In addition, each authorized response is incorporated in the cumulative response calculations in state 640.

In state 638, any responses received are added to the master forum page database and in states 672 through 682 (Refer to FIG. 4B) the data is downloaded to registered participants computers consistent with their authorization levels. For example, if so authorized, the central forum coordinator can link directly to the trading data relevant to the forum of interest, thus bypassing the home pages on the originating trading network or Web site. States 612 through 622 can be repeated for each trading company or communications network collaborating in the forum of interest.

Figure 4B:
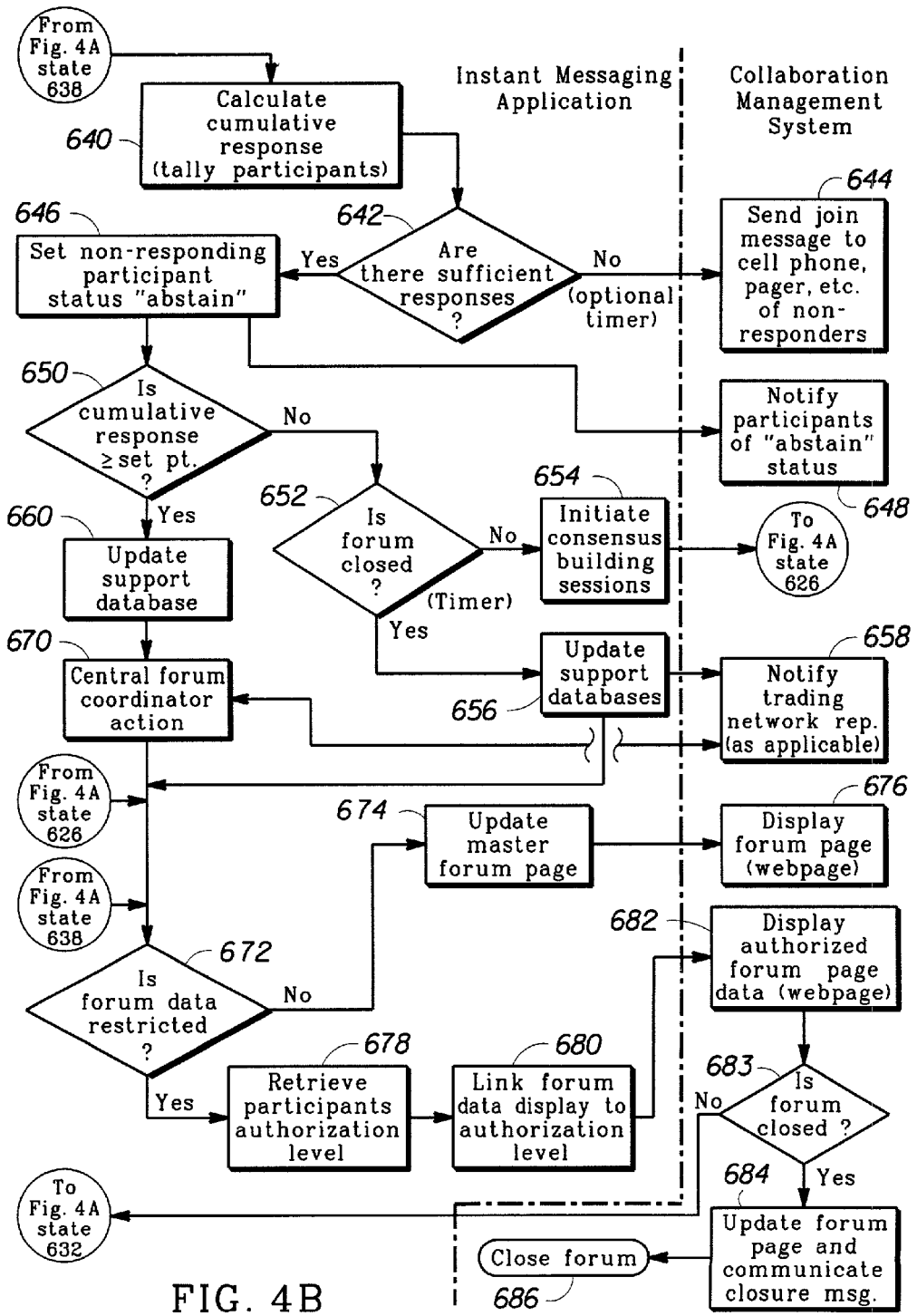

Then referring to FIG. 4B, the instant messaging application calculates the cumulative response for the query proposal and determines which participants have not yet responded by tally in state 640. Then in state 642, it is determined if sufficient responses have been received, for example the program verifies if the decision requires a minimum number of participants (quorum) or if select participant's responses are required (critical) for establishing a final decision. If there are not sufficient responses, then in state 644, one or more requests alerting the non-responding participants to join the forum are communicated to the participant's email, pager, cell phone, and the like. Optionally, additional messages may be submitted on a timed basis to some or all of the non-responding forum participants. If there are sufficient responses and the non-responding member is not critical for progressing the forum, then in state 646, an "abstain" status is input into the forum participant's record and the server notifies the participant accordingly in state 648.

In state 650, consensus is determined by comparing the support received (cumulative response) in favor of the forum proposal with a minimum setpoint value devised to measure cumulative support of a decision. If in state 650, the cumulative response does not meet the minimum setpoint value, then it is determined in state 652, whether the forum is closed. If the forum is not closed as determined by a timer or other pre-established conditions, then in state 654, the instant messaging application may initiate one or more consensus-building sessions such as an arbitration or intra-group caucusing. The consensus-building sessions promote further interactive discussions that pass control back to state 626 for formulating additional queries or adjusting setpoint values (Refer to FIG. 4A).

However, if the forum is closed then the central forum coordinator updates all support databases in state 656, notifies the trading network representative (as applicable) in state 658, and downloads the data for interactive display on the forum page according to states 672 through 682. In state 684, a final message is delivered, and finally in state 686, the forum is closed.

If, however, state 650 determines that the cumulative response meets or exceeds the minimum setpoint value, then the collective decision is input into the master forum page in state 660. In state 670, the central forum coordinator implements the decision and updates the master forum page to reflect the action taken. In the trading network example, this collaborative decision can be used to initiate a specific course of action that may involve further communications with remote trading networks as in state 658, for example authorizing the purchase of a proposed issue of stock through a trading representative. In states 672 through 682, the data is downloaded for interactive display on the forum page, and in state 684, the central forum coordinator delivers a closure message to all registered forum participants and finally in state 686, the forum is closed.

Now referring to FIG. 4B, in states 672 through 682 the data is downloaded to registered participants' computers consistent with their authorization levels. Each forum participant that is authorized to receive communications for a specific forum can view forum data consistent with their authorization level. In state 672, if there are no restrictions for sharing forum data, then all forum participants have equal access to communications. In this event, the master forum page is updated to include the forum queries in state 674, and in state 676, the forum page is downloaded for display on the forum participants' computers. Security passwords can be used to gain access to the forum page. Alternatively, a Web page is generated and the forum participants can access forum data through the Internet.

However, if in state 672 some forum data is restricted, then the restricted data is communicated only to those forum participants having the proper authorization level. In state 678, each forum participant's authorization level is retrieved from the appropriate forum database and in state 680, only the data linked with the participant's authorization level is communicated. In state 682, the server downloads only the data that each forum participant is authorized to receive. Regardless, the display may be password protected to ensure that the restricted data is broadcast only to those participants properly authorized for its receipt. States 678 to 682 are repeated for each forum participant requesting access to restricted data on the forum page.

If in state 683, the forum is closed, then in state 684, the forum page is updated to reflect the closure status and a closure message is communicated to the forum participants. In state 686, the central forum coordinator closes the forum and takes the appropriate action based on cumulative support received at forum closure. If there is sufficient support to constitute a decision, for example if the cumulative support meets the minimum setpoint value, then this decision can authorize the central forum coordinator to automatically implement the proposed course of action, such as transmitting a stock purchase order to a remote trading network. If however, in state 683, the forum remains open, then the central forum coordinator awaits further forum communications and updates the forum page accordingly. If an arbitration or a caucus is in session then forum control returns to state 626 as discussed previously.

Figure 5A:
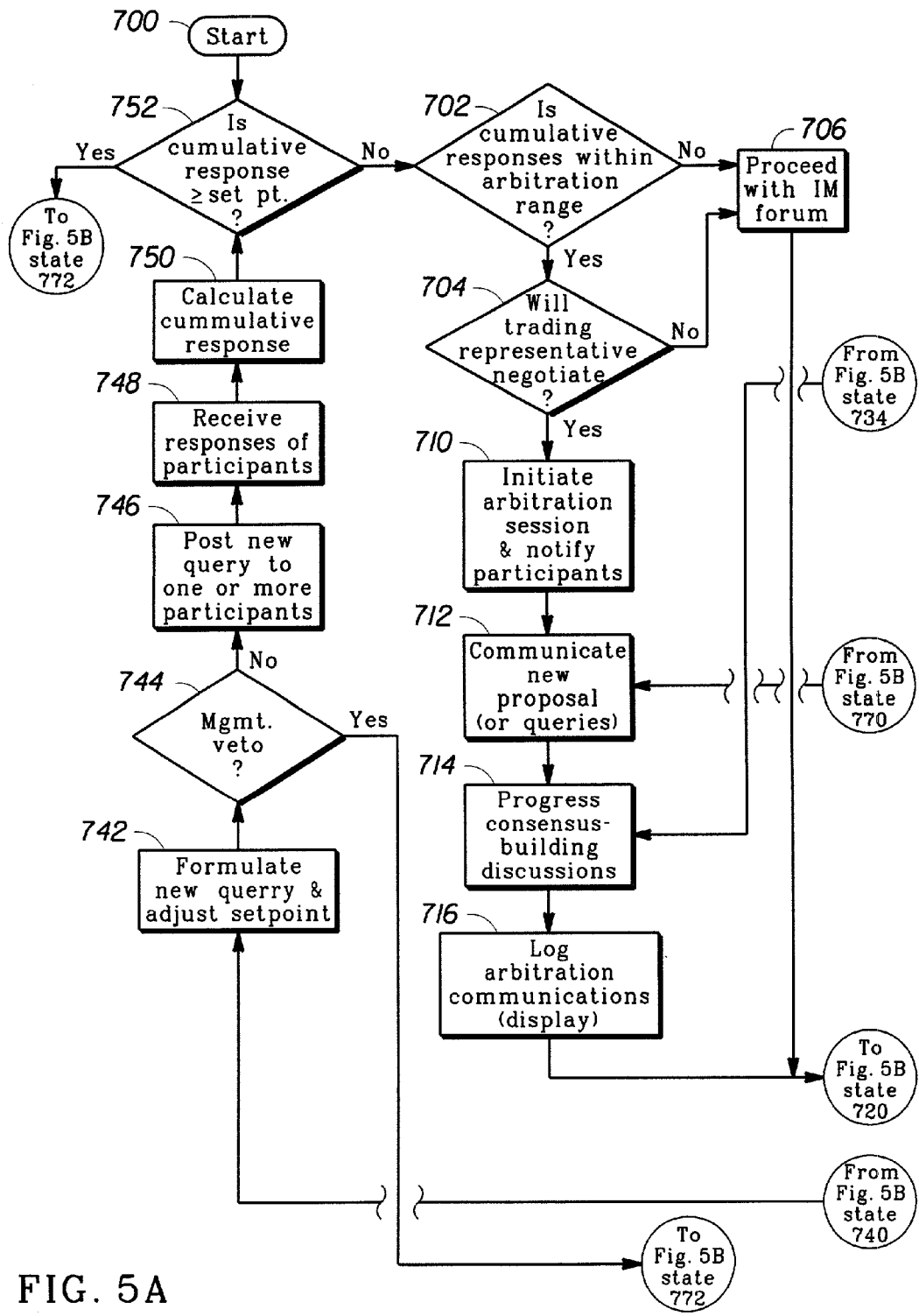
FIG. 5 is a flow diagram of a method for building consensus within a forum by invoking arbitration and caucussing sessions.
Figure 5B:
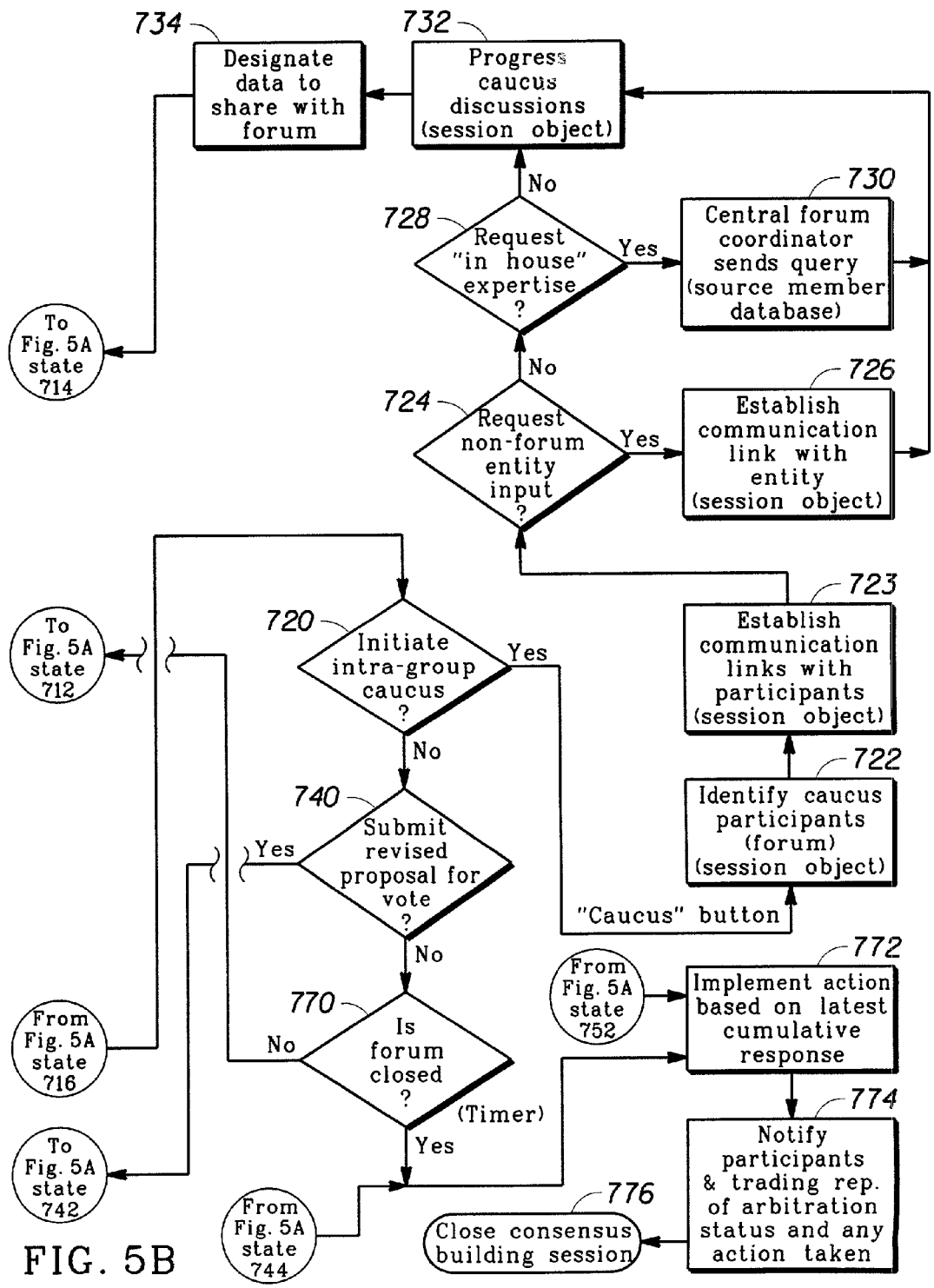

FIG. 5 is a flow diagram illustrating a method for building consensus within a forum.

Consensus-building mechanisms, such as arbitration and caucusing discussed below, can be used to progress an ongoing decision-making forum. It is further noted that other consensus-building programs such as the use of weighting factors or a hierarchy of authorization levels can also be supported on the instant messaging application framework.

The proposed instant messaging application program describes a series of steps designed to increase the efficiency and effectiveness of real-time decision-making forums that focus on consensus-building techniques such as online arbitration and intra-group caucussing for advancing forum discussions. In this respect, the collective decision is determined by responses to queries processed by the instant messaging application as logical decision parameters that each forum group can customize according to their own policies.

Consensus-building mechanisms offer distinct advantages in a forum setting. The goal is to expedite the collaborative decision-making process and thus, take advantage of opportunities as they arise on an interactive trading network. Group members benefit by having the ability to participate in refining and customizing decision parameters and setpoint values as the decision-making process progresses. The customization process can be automated for transactions routinely performed by the same group of individuals, for example to anticipate the degree of risk, if any, savings plan members will collectively support when purchasing stock options. The arbitration is then structured to focus specifically on clarifying these issues in relation to the stock proposal.

An arbitration session is a method involving a series of iterative steps devised to move a group toward consensus. An arbitration session may be designated as either a "public" or "private" session. Preferably, in a decision-making forum, a "public" arbitration session is used to arrive at a decision that reflects the collective will of the forum participants. In a public arbitration all communications are made available to each member of the group. By contrast, a "private" arbitration is used whenever two or more forum participants desire to discuss confidential information, gather further information, communicate off the forum record or receive input from non-forum participants. Thus, a "private" arbitration can be useful for building consensus between upper level management or other participants having "different agendas" from the group as a whole. Comparable objectives can be met by establishing an intra-group caucus. The main difference between a "private" arbitration and an intra-group caucus, for the purposes of this discussion, is that arbitration imposes predetermined constraints, whereas the caucus promotes a free flow of information.

The method described below uses public arbitration as the primary means for invoking a sufficient level of support to collectively decide whether or not to invest in a given stock proposal. If it is determined in state 752 that the cumulative response for a proposal does not meet the setpoint value, but falls within a predetermined range 702 (tolerance) likely to lead to consensus, then in state 704, the central forum coordinator communicates with the trading representative and requests negotiation. If the trading representative agrees to negotiate then an arbitration session is initiated and the forum participants notified in state 710. If however, state 702 determines that the cumulative support does not fall within the specified arbitration range or if, in state 704, the trading representative declines to negotiate, then the forum progresses without arbitration in state 706.

In state 712, a new proposal or further queries are communicated to the forum participants and in state 714, consensus-building discussions progress under the supervision of the central forum coordinator. All communications are logged in the forum logging database and displayed on the forum page in state 716. Preferably, an arbitration status screen, logging all authorized forum communications, is displayed on the forum page.

In state 720, at least one forum participant may request to initiate a caucus, preferably by selecting the "caucus" button displayed on their graphical interface unit ("GUI"). This request is communicated to the collaboration manager that creates a private session object that identifies participants having comparable interests (or participants designated by the initiating caucus member) in state 722. Each participant receives a "join caucus" message on their GUI and by responding to this message, establishes a communication link to the caucus in state 723. If the initiating caucus member requests input from one or more non-forum entities in state 724, then the session object similarly establishes a communication link with these entities in state 726.

If in state 728, the initiating caucus member requests in-house expertise, then in state 730, the member sends queries to the central forum coordinator who forwards these queries on to individuals having the desired expertise as recorded in the source member database. It is envisioned that the individuals having the desired expertise respond to the queries through email communications. In state 732, each caucus participant and any shared application programs send information to the session object by "posting" or sending a message to the session object and the caucus discussions are progressed in this manner. In state 734, the caucussing forum participants can decide to share some or all of the caucus data with non-caucus forum members. Alternatively, the caucus data can be restricted such that only forum participants having the requisite authorization level can access caucus data. In any event, the caucussing forum participants can continue to collaborate with the ongoing arbitration session in state 714.

In state 740, the forum participants decide when they have performed sufficient discussions on the revised proposal. Preferably, each forum participant sends a message to the central forum coordinator requesting that the proposal be submitted for a vote. When sufficient requests have been logged then in state 742, the central forum coordinator formulates a new query and may also adjust the setpoint based on the revised trading proposal and input received in the arbitration discussions. The new query will reflect the revised trading proposal, but may include further conditions that forum members have proposed in the arbitration session. Of course, any proposal may be subject to management veto. If management approves the revised proposal (and any conditions) in state 744, or in the event the proposal is not subject to management veto, then the central forum coordinator communicates the new query to the forum participants, the forum participants respond to the query (or submit further messages) in state 748 and the cumulative response is calculated in state 750.

If in state 752, the cumulative response still does not meet the setpoint, but falls within the arbitration range in state 702, the entire arbitration cycle is repeated until state 770 determines that the forum is closed. Alternatively, if in state 740, the revised proposal is not submitted for a vote and the forum remains open in state 770, then new proposals or queries leading to further conditions may be developed by forum participants in state 712 and the arbitration session continues. If however, the proposal is vetoed by management in state 744, or when the forum is closed as determined by a timer or other pre-established requirements in state 770, then the action taken will be consistent with the latest cumulative response calculated in state 772.

If however, in state 752, the cumulative response does meet the setpoint, then the revised proposal is approved and the central forum coordinator can take action and complete the transaction. In state 774, the forum participants and the trading representatives are notified of the arbitration status at the close of the session and are further notified of any action taken. Finally, in state 776 the consensus-building session is closed.

What is claimed is:

1. A computer implemented method, comprising:
   maintaining identification for a group of decision-making entities in a memory device;
   maintaining a setpoint representing a minimum cumulative support required to implement a proposed action;
   communicating a query to the plurality of decision-making entities, wherein the query includes a description of the proposed action;
   receiving responses to the query from the plurality of decision-making entities, wherein each response includes an indicator of support for the proposed action;
   determining the cumulative support from the query responses received;
   automatically communicating a second query to the plurality of decision-making entities if an additional support necessary to reach the minimum setpoint value is less than a second setpoint; and
   automatically implementing the proposed action if the cumulative support is greater than the setpoint by transmitting an instruction to one or more trading networks.

2. The method of claim 1, further comprising:
   imposing arbitration among the plurality of decision-making entities if the query responses provide cumulative support less than the minimum setpoint value.

3. The method of claim 1, wherein the indication of support is of a type selected from qualitative, quantitative, functional or a combination thereof.

4. The method of claim 1, further comprising:
   sending a communication to each of the plurality of decision-making entities staring an amount of additional support necessary to reach the minimum setpoint.

5. The method of claim 1, further comprising:
   initiating an intra-group caucus between a plurality of the decision-making entities.

6. The method of claim 1, wherein the query is formulated by one of the plurality of decision-making entities and transmitted to a central coordinator for subsequent communication to the plurality of decision-making entities.

7. The method of claim 9, wherein the setpoint is established by the decision-making entity that formulates the query.

8. The method of claim 1, wherein the identification of each decision-making entity includes a weighting factor; and wherein the step of determining the cumulative support includes applying the weighting factor against each indicator of support for the decision.

9. The method of claim 1, wherein the query responses include weighting factors or other criteria relevant to the level of support.

10. The method of claim 1, further comprising:
    querying one of the plurality of decision-making entities for authorization to implement the decision if the query responses provide cumulative support greater than the minimum setpoint.

11. The method of claim 1, further comprising:
    obtaining approval or denial to implement the decision.

12. The method of claim 1, wherein one or more of the plurality of decision-making entities communicates through a personal digital assistant.

13. The method of claim 1, wherein the communications occur over a wireless network.

14. The method of claim 1, wherein the communications utilize instant messaging.

15. The method of claim 1, further comprising:
    providing a collaboration manager to interface between decision-making entities having different computer platforms or applications.

16. A computer implemented method, comprising:
    maintaining identification for a group of decision-making entities in a memory device;
    maintaining a setpoint representing a minimum cumulative support required to implement a proposed action;
    communicating a query to the plurality of decision-making entities, wherein the query includes a description of the proposed action;
    receiving responses to the query from the plurality of decision-making entities, wherein each response includes an indicator of support for the proposed action;
    determining the cumulative support from the query responses received;
    automatically implementing the proposed action if the cumulative support is greater than the setpoint;
    imposing arbitration among the plurality of decision-making entities if the query responses provide cumulative support less than the minimum setpoint values;
    communicating the cumulative support to the plurality of decision-making entities;
    communicating a second query based on this cumulative support;
    receiving responses to the second query from the plurality of decision-making entities, wherein each of the second responses include a revised indication of support;
    determining a revised cumulative support for the second query incorporating the revised indications of support; and
    implementing the decision if the revised cumulative support is greater than the minimum setpoint.

17. The method of claim 16, wherein the identification of each decision-making entity includes a weighting factor, the step of determining the cumulative support further includes:

applying the weighting factor against each indicator of support for the decision.

18. The method of claim 16, further comprising:

sending a communication to each of the plurality of decision-making entities stating an amount of additional support necessary to reach the minimum setpoint.

19. The method of claim 16, further comprising:

automatically communicating a second query to the plurality of decision-making entities if the additional support necessary to reach the minimum setpoint value is less than a second setpoint.

20. A computer implemented method, comprising:

maintaining identification for a group of decision-making entities in a memory device;

maintaining a setpoint representing a minimum cumulative support required to implement a proposed action;

communicating a query to the plurality of decision-making entities, wherein the query includes a description of the proposed action;

receiving responses to the query from the plurality of decision-making entities, wherein each response includes an indicator of support for the proposed action;

determining the cumulative support from the query responses received; and automatically implementing the proposed action if the cumulative support is greater than the setpoint;

communicating the cumulative support to the plurality of decision-making entities;

communicating a second query based on this cumulative support;

receiving responses to the second query from the plurality of decision-making entities, wherein each of the second responses include a revised indication of support;

determining a revised cumulative support for the second query incorporating the revised indications of support; and implementing the decision if the revised cumulative support is greater than the minimum setpoint.

21. A computer program product including computer readable instructions embodied on a computer readable medium, wherein the computer readable instructions when executed on a computer cause the computer to perform steps comprising:

maintain identification for a group of decision-making entities in a memory device;

maintain a setpoint representing a minimum cumulative support required to implement a proposed action;

communicate a query to the plurality of decision-making entities, wherein the query includes a description of the proposed action;

receive responses to the query from the plurality of decision-making entities, wherein each response includes an indicator of support for the proposed action;

determine the cumulative support from the query responses received;

automatically communicate a second query to the plurality of decision-making entities if an additional support necessary to reach the minimum setpoint is less than a second setpoint; and automatically implement the decision if the cumulative support is greater than the setpoint, including transmit an instruction to one or more trading networks.

22. The computer program product of claim 21, further comprising:

impose arbitration among the plurality of decision-making entities if the query responses provide cumulative support less than the minimum setpoint.

23. The computer program product of claim 21, further comprising:

formulate a decision of a type selected from qualitative, quantitative, functional or a combination of decisions thereof.

24. The computer program product of claim 21, further comprising:

send a communication to each of the plurality of decision-making entities stating an amount of additional support necessary to reach the minimum setpoint.

25. The of claim 21, further comprising initiate an intra-group caucus between a plurality of the decision-making entities.

26. The computer program product of claim 21, further comprising:

generate a query to one of the plurality of decision-making entities for authorization to implement the decision if the query responses provide cumulative support greater than the minimum setpoint.

27. The computer program product of claim 21, further comprising:

maintain a weighting factor for each of the decision-making entities; and apply the weighting factor for each of the decision-making entities against the indication of support received from the corresponding decision-making entity.

28. The computer program product of claim 21, wherein the indication of support provides a graduated level of support.

29. A computer program product including computer readable instructions embodied on a computer readable medium, wherein the computer readable instructions when executed on a computer cause the computer to perform steps comprising:

maintain identification for a group of decision-making entities in a memory device;

maintain a setpoint representing a minimum cumulative support required to implement a proposed action;

communicate a query to the plurality of decision-making entities, wherein the query includes a description of the proposed action;

receive responses to the query from the plurality of decision-making entities, wherein each response includes an indicator of support for the proposed action;

determine the cumulative support from the query responses received;

automatically implement the decision if the cumulative support is greater than the setpoint;

impose arbitration among the plurality of decision-making entities if the query responses provide cumulative support less than the minimum setpoint; and automatically communicate a second query to the plurally of decision-making entities if the additional support necessary to reach the minimum setpoint is less than a second setpoint.

30. The computer program product of claim 29, further comprising:

maintain a weighting factor for each of the decision-making entities; and apply the weighting factor for each of the decision-making entities against the indicator of support received from the corresponding decision-making entity.

31. The computer program product of claim 30, further comprising:
    identify a query that is formulated by one of the plurality of decision-making entities; and
    transmit the query to the plurality of decision-making entities.

32. The computer program product of claim 31, further comprising: identify a setpoint established by the decision-making entity that formulated the query.

33. The computer program product of claim 29, further comprising:
    communicate the cumulative support to the plurality of decision-making entities;
    communicate a second query based on this cumulative support;
    receive responses to the second query from the plurality of decision-making entities, wherein each of the second responses include a revised indication of support;
    determine a revised cumulative support for the second query incorporating the revised indications of support; and
    implement the decision if the revised cumulative support is greater than the minimum setpoint value.

34. The computer program product of claim 29, further comprising:
    an amount of additional support necessary to reach the minimum setpoint value to each of the plurality of decision-making entities.

35. A computer program product including computer readable instructions embodied on a computer readable medium, wherein the computer readable instructions when executed on a computer cause the computer to perform steps comprising:
    maintain identification for a group of decision-making entities in a memory device;
    maintain a setpoint representing a minimum cumulative support required to implement a proposed action;
    communicate a query to the plurality of decision-making entities, wherein the query includes a description of the proposed action;
    receive responses to the query from the plurality of decision-making entities, wherein each response includes an indicator of support for the proposed action;
    determine the cumulative support from the query responses received;
    automatically implement the decision if the cumulative support is greater than the setpoint;
    communicate the cumulative response to the plurality of decision-making entities;
    communicate a second query based on this cumulative response;
    communicate second responses from the plurality of decision-making entities, wherein the second responses comprise revised weighting factors;
    determine the cumulative response to the second query incorporating the revised weighting factors; and
    implement the decision if the second query responses provide cumulative support greater than the minimum setpoint value.

* * * * *

UNITED STATES PATENT AND TRADEMARK OFFICE
CERTIFICATE OF CORRECTION

PATENT NO. : 6,980,983 B2
DATED : December 27, 2005
INVENTOR(S) : Dwip N. Banerjee et al.

It is certified that error appears in the above-identified patent and that said Letters Patent is hereby corrected as shown below:

Column 17,
Line 62, replace "staring" with -- stating --.

Column 21,
Line 30, insert -- transmit -- before "an amount of additional support necessary to reach the".

Signed and Sealed this

Sixteenth Day of May, 2006

JON W. DUDAS
*Director of the United States Patent and Trademark Office*